US012299683B2

(12) United States Patent
Williams

(10) Patent No.: US 12,299,683 B2
(45) Date of Patent: May 13, 2025

(54) GLOBAL REMITTANCE SYSTEM AND METHOD

(71) Applicant: Visa International Service Association, San Francisco, CA (US)

(72) Inventor: Otto Williams, Foster City, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 954 days.

(21) Appl. No.: 17/273,658

(22) PCT Filed: Sep. 4, 2019

(86) PCT No.: PCT/US2019/049602
§ 371 (c)(1),
(2) Date: Mar. 4, 2021

(87) PCT Pub. No.: WO2020/051250
PCT Pub. Date: Mar. 12, 2020

(65) Prior Publication Data
US 2021/0365942 A1 Nov. 25, 2021

Related U.S. Application Data

(60) Provisional application No. 62/727,450, filed on Sep. 5, 2018.

(51) Int. Cl.
G06Q 40/00 (2023.01)
G06Q 20/32 (2012.01)
(Continued)

(52) U.S. Cl.
CPC ....... *G06Q 20/401* (2013.01); *G06Q 20/3223* (2013.01); *G06Q 20/36* (2013.01); *G06Q 40/02* (2013.01); *G06Q 40/04* (2013.01)

(58) Field of Classification Search
CPC .. G06Q 20/401; G06Q 20/3223; G06Q 20/36; G06Q 40/02; G06Q 40/04
See application file for complete search history.

(56) References Cited

U.S. PATENT DOCUMENTS 6,609,113 B1 8/2003 O'Leary et al.
7,848,980 B2 12/2010 Carlson
(Continued)

FOREIGN PATENT DOCUMENTS

CN 104657848 A 5/2015
CN 104756141 A 7/2015
(Continued)

OTHER PUBLICATIONS

Geithner, Timothy (General principles for international remittance services, section 2.3; The World Bank, Jan. 2007) (Year: 2007).*
(Continued)

*Primary Examiner* — Bruce I Ebersman
*Assistant Examiner* — Mark H Gaw
(74) *Attorney, Agent, or Firm* — Kilpatrick Townsend & Stockton LLP

(57) ABSTRACT

A system and method are disclosed. The method comprises receiving, by a server computer from a first user device, transfer data regarding a receiver operating a second user device. The server computer can transmit a verification request message to a wallet aggregator computer. The server computer can then receive a verification response message from the wallet aggregator, the verification response message comprising an account identifier of the receiver. The server computer can then transmit a confirmation request message to the first user device and receive a confirmation response message. The server computer can then send a transaction message (e.g., an OCT message) comprising the receivers account identifier.

16 Claims, 7 Drawing Sheets

(51) Int. Cl.
*G06Q 20/36* (2012.01)
*G06Q 20/40* (2012.01)
*G06Q 40/02* (2023.01)
*G06Q 40/04* (2012.01)

(56) References Cited

U.S. PATENT DOCUMENTS

| | | |
|---|---|---|
| 11,062,321 B2* | 7/2021 | Jeong .................. G06Q 20/405 |
| 2007/0078763 A1 | 4/2007 | Babi et al. |
| 2008/0065531 A1 | 3/2008 | Smith et al. |
| 2011/0145152 A1* | 6/2011 | McCown ........... G06Q 20/3674 |
| | | 705/67 |
| 2012/0209762 A1 | 8/2012 | Metaireau et al. |
| 2015/0046331 A1 | 2/2015 | Gupta et al. |
| 2015/0066753 A1 | 3/2015 | Hall et al. |
| 2016/0267444 A1* | 9/2016 | Mutahi ................ G06Q 20/322 |
| 2019/0043310 A1* | 2/2019 | Higgins ............. G07F 17/3218 |
| 2020/0013028 A1* | 1/2020 | Black ................... G06Q 20/027 |
| 2021/0027285 A1* | 1/2021 | Jalil ................. G06Q 20/38215 |

FOREIGN PATENT DOCUMENTS

| | | |
|---|---|---|
| CN | 107636712 A | 1/2018 |
| EP | 2015241 | 1/2009 |
| JP | 5530698 | 4/2014 |

OTHER PUBLICATIONS

Application No. PCT/US2019/049602, International Search Report and Written Opinion, Mailed on Dec. 19, 2019, 10 pages.
Office Action, mailed May 14, 2024, for Chinese Application No. CN201980057962.1, 26 pages.
Office Action, mailed Sep. 25, 2024, Chinese Application No. CN201980057962.1, 23 pages.
Decision on Rejection, mailed Feb. 14, 2025, Application No. CN201980057962.1, 25 pages with English translation.

* cited by examiner

GLOBAL REMITTANCE SYSTEM AND METHOD

CROSS-REFERENCE TO RELATED APPLICATIONS

This is a U.S. National Phase application of International Patent Application No. PCT/US2019/049602, filed Sep. 4, 2019, which claims priority to U.S. Patent Application No. 62/727,450, filed on Sep. 5, 2018, the disclosures of which are herein incorporated by reference in their entireties for all purposes.

BACKGROUND

Current approaches of transferring funds internationally from a sender entity to a receiving entity involves a sending entity's bank holding float funds in multiple overseas markets, in order to be able to settle with the receiving entity's bank. This can significantly delay the fund transfer between entities.

Embodiments of the invention address these and other problems individually and collectively.

SUMMARY

One embodiment of the invention is directed to a method comprising receiving, by a server computer from a first user device, transfer data regarding a receiver operating a second user device, the transfer data comprising a mobile number and a name. The method may further comprise transmitting, by the server computer, a verification request message. In some embodiments, the verification request message comprises the mobile number and the name. The method may further comprise receiving, by the server computer, a verification response message, the verification response message comprising an account identifier of the receiver. The method may further comprise transmitting, by the server computer, a confirmation request message to the first user device. The method may further comprise receiving, by the server computer, a confirmation response message from the first user device. The method may further comprise transmitting, by the server computer, a transaction message (e.g., an original credit transaction (OCT) message) comprising the account identifier. In some embodiments, sending the transaction message causes an alert to be provided to the second user device.

Another embodiment of the invention is directed to a server computer programmed to perform the above-noted method.

Another embodiment of the invention is directed to a method. The method may include receiving, by a processing network computer from first user device via a server computer, transfer data comprising a mobile number and a name of a receiver operating a second user device. The method may include transmitting, by the processing network computer, a verification request message, wherein the verification request message comprises the mobile number and the name. The method may include receiving, by the processing network computer, a verification response message, the verification response message comprising an account identifier of the receiver. The method may include transmitting, by the processing network computer, a confirmation request message to the first user device via the server computer. The method may include receiving, by the processing network computer, a confirmation response message from the first user device via the server computer. The method may include transmitting, by the processing network computer, a transaction message (e.g., an OCT message) comprising the account identifier, wherein sending the transaction message causes an alert to be provided to the second user device.

Another embodiment of the invention is directed to a processing network computer comprising a processor and a computer readable medium coupled to the processor, the computer readable medium comprising code, executable by the processor, to cause the processing network computer to perform operations. The operations may include receiving, from a first user device via a server computer, transfer data regarding a receiver operating a second user device, the transfer data comprising a mobile number and a name. The operations may include transmitting a verification request message, wherein the verification request message comprises the mobile number and the name. The operations may include receiving a verification response message comprising an account identifier of the receiver. The operations may include transmitting a confirmation request message to the first user device via the server computer. The operations may include receiving a confirmation response message from the first user device via the server computer. The operations may include transmitting a transaction message (e.g., an OCT message) comprising the account identifier, wherein sending the transaction message causes an alert to be provided to the second user device.

Further details regarding embodiments of the invention can be found in the Detailed Description and the Figures.

DETAILED DESCRIPTION

Figure 1:
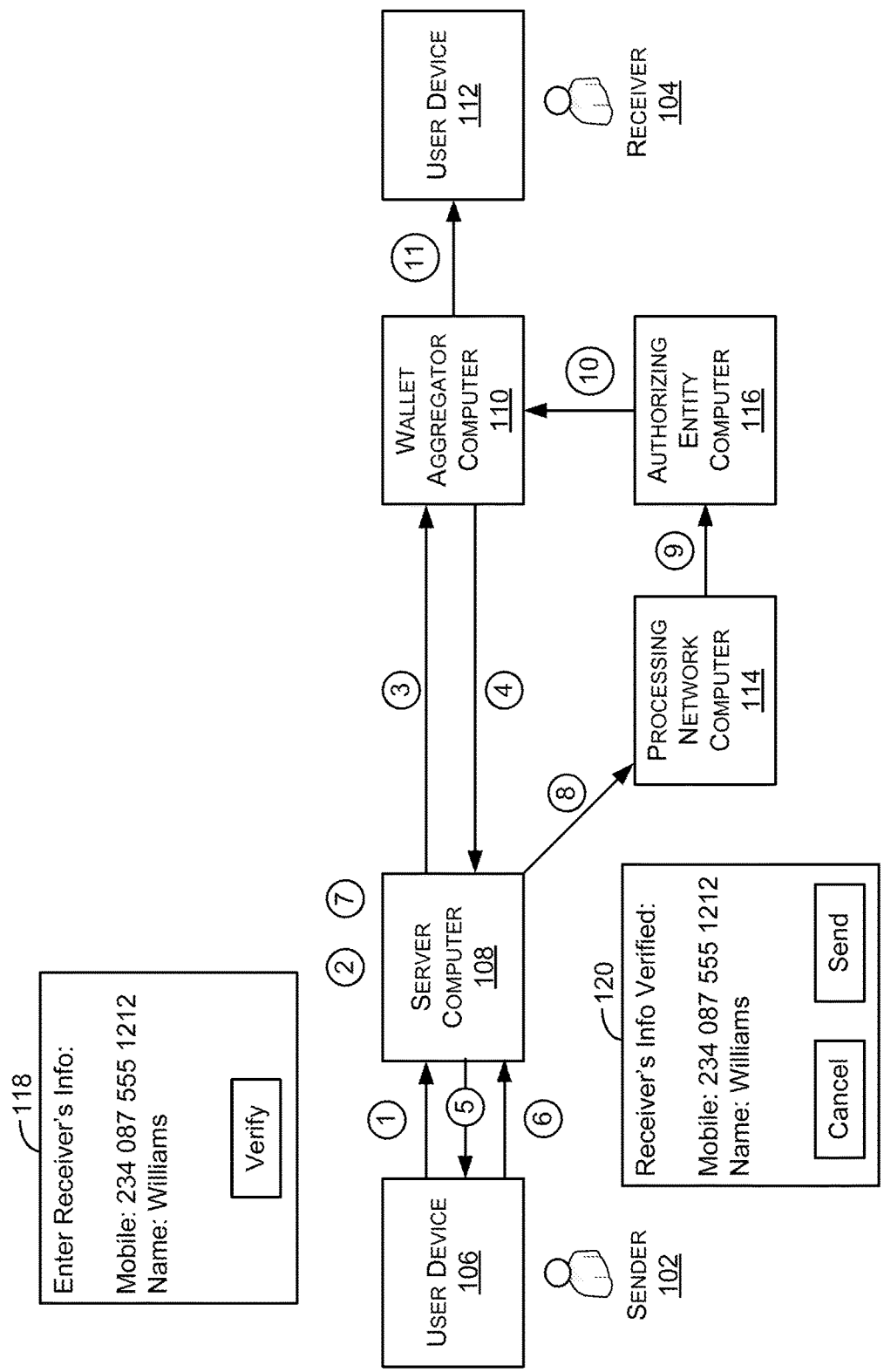
FIG. 1 shows a flow diagram of an exemplary method, in accordance with at least one embodiment.

Prior to discussing embodiments of the invention, some terms can be described in further detail.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "user device" may be any suitable device that can interact with a user (e.g., a payment card or mobile phone).

A user device may communicate with or may be at least a part of an access device or a server computer. User devices may be in any suitable form. Some examples of user devices include POS devices, mobile devices, PDAs, personal computers (PCs), tablet PCs, wearable devices (e.g., smart watches), vehicles with communication capabilities (e.g., smart cars), etc.

A "mobile device" may comprise any electronic device that may be transported and operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of mobile devices include mobile phones (e.g., cellular phones), PDAs, tablet computers, net books, laptop computers, personal music players, hand-held specialized readers, wearable devices (e.g., watches, glasses, lenses, tattoos, clothing, etc.), vehicles (e.g., cars), etc. A mobile device may comprise any suitable hardware and software for performing such functions, and may also include multiple devices or components (e.g., when a device has remote access to a network by tethering to another device—i.e., using the other device as a relay—both devices taken together may be considered a single mobile device).

A "user" may include an individual. In some embodiments, a user may be associated with one or more personal accounts and/or user devices. In some embodiments, a user may be a sender or a receiver.

A "digital wallet" can include an electronic device or software that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like.

A "digital wallet provider" may include an entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile device or access device. A digital wallet provider may comprise of one or more digital wallet server computers and digital wallet databases that are used to manage account data for a user of a digital wallet.

An "account identifier" may include an identifier for an account. An account identifier may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

A "transfer service provider" may refer to a provider of transfer services. A transfer service may include a service for transferring funds between accounts (e.g., accounts corresponding to users in different countries). By way of example, a transfer service provider may provide financial servers including, but not limited to, money transfers. In some embodiments, a transfer service provider may be any suitable entity that can facilitate global funds transfers between a sender and receiver of different countries. Examples of transfer service providers can include Western Union©, MoneyGram©, Transferwise©, and/or Remitly©, to name a few.

A "transfer service provider computer" may be a computer operated on behalf of a transfer service provider. In some embodiments, a transfer service provider computer may be communicatively connected to one or more wallet aggregator computers. In some embodiments, a transfer service provider computer can be communicatively connected to a processing network computer in communication with one or more wallet aggregator computers.

A "wallet aggregator computer" may be a computer operated on behalf of a wallet aggregator. In some embodiments, a wallet aggregator can be a digital wallet provider and/or a wallet aggregator can be a service provider configured to aggregate account data from any suitable number of digital wallet providers. For example, some wallet aggregator computers can be configured to aggregate account data corresponding to a number of digital wallet providers corresponding to a particular region, area, country, or the like. Although wallet aggregator computers could additionally or alternatively aggregate account data corresponding to digital wallet providers of differing regions, areas, countries, or the like.

A "processing network computer" may operate as part of a network that includes or operates at least one server computer used for transaction processing. A processing network may include data processing subsystems, networks, and operations used to support and deliver authorization services, exception file services, and clearing and settlement services. An exemplary processing network may include a network (e.g., VisaNet™) that is able to process credit card transactions, debit card transactions, and other types of commercial transactions. In particular, a processing network computer may be part of an integrated payments system (Integrated Payments system) which processes authorization requests and a Base II system, which performs clearing and settlement services.

An "Account Funding Transaction" AFT is a transaction designed to supply funds to another account such as a credit, prepaid, debit, ATM or on-line account. In some embodiments, an AFT may be utilized to pay a service provider for sending funds to the recipient and results in a debit to a sender's account (e.g., a payment card account). The amount of the debit may be the amount of the credit to be delivered to the recipient plus any fees being charged by the transfer service provider such as a transfer fee, or a currency conversion fee when the transfer service provider performs currency exchange and its acquirer submits the transaction in the preferred currency of the recipient. In some embodiments, an AFT may be in the form of an authorization request message. An "AFT message" may be used to refer to any suitable message with which the AFT is performed.

A "transaction message" is a message used for performing a transaction. A transaction message may be in any suitable form. An example of a transaction message may include an original credit transaction (OCT) message, an automated clearinghouse (ACH) message, or the like. In some embodiments, a transaction message may be utilized to transfer funds from one account to another.

An "Original Credit Transaction" (OCT) is typically a clearing and settlement credit transaction designed for use in business applications such as a business money transfer or business-to-consumer repayments. When used in the context of the present invention for money transfer, the OCT is the transaction used to deliver funds to the recipient account. It may be separate from, and take place after, a corresponding AFT. This timing may be utilized to ensure that payment funds are secured before funds are sent to the recipient. The term "OCT message" may be used to refer to any suitable message with which an OCT is performed.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CW (card verification value), a dCW (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "transfer request message" may be a message with which a transfer is requested. A transfer request message may be in any suitable format and may include any suitable combination of transfer data. "Transfer data" may include, but is not limited to, any suitable combination of: a mobile number, a name, an address, an email address, a country, a wallet identifier, a username, an amount, a currency type corresponding to the amount, an account identifier associated with the transfer requestor, and/or the like.

A "verification request message" may be a message with which data verification is requested. A verification request message may be in any suitable format and may include transfer data corresponding to a transfer request.

A "verification response message" may be a message with which a response corresponding to a verification request may be provided. A verification response message may be in any suitable format and may include transfer data corresponding to a transfer request, an account identifier identified as being associated with some portion of the transfer data, and/or an indicator that the transfer data was verified or not. The indicator may indicate that the transfer data was found to be valid (matched previously stored data) or invalid (was not found, or did not match previously known stored).

A "confirmation request message" may be a message with which confirmation of a transfer request is requested. A confirmation request message may be in any suitable format and may include transfer data corresponding to a transfer request.

A "confirmation response message" may be a message with which a response corresponding to a confirmation request may be provided. A confirmation response message may be in any suitable format and may include transfer data corresponding to a transfer request, and/or an indicator confirming that the transfer request is to proceed or the transfer request is to be cancelled.

A "registration request message" may be a message with which registration is requested. A registration request message may be in any suitable format and may include any suitable registration information. Registration information may include, but is not limited to, an identifier associated with the requestor and/or the requestor's computer, a country, country code, area code, address, region, or the like corresponding with the requestor, or any suitable combination of the above.

A "registration response message" may be a message with which a response corresponding to a registration request may be provided. A registration response message may be in any suitable format and may include an indicator confirming that the registration request has been successfully or unsuccessfully processed.

An "authorizing entity" may be an entity that authorizes a request. Examples of an authorizing entity may be an issuer, a governmental agency, a document repository, an access administrator, etc. An authorizing entity may operate an authorizing entity computer.

An "issuer" may typically refer to a business entity (e.g., a bank) that maintains an account for a user. An issuer may also issue payment credentials stored on a portable device, such as a cellular telephone, smart card, tablet, or laptop to the user.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Current approaches of transferring funds from a sender to a receiver involves a sending entity's bank holding float funds in multiple overseas markets, in order to be able to settle with the receiver's bank. According to embodiments of the invention, funds can be immediately pushed to the receiver's account identifier (e.g., PAN) instead of being held in float funds in multiple overseas markets. A settlement process can then be performed in the receiver's country. This also opens up the remittance send opportunity to many smaller players who would otherwise not be able to hold funds overseas.

FIG. 1 shows a flowchart of a method according to an embodiment of the invention. The method illustrated in FIG. 1 will be described in the context of a sender 102 transferring funds to a receiver 104 located in a different country. It is understood, however, that the invention can be applied to other circumstances. Although the steps are illustrated in a specific order, it is understood that embodiments of the invention may include methods that have the steps in different orders. In addition, steps may be omitted or added and may still be within embodiments of the invention.

FIG. 1 includes a system 100 comprising a number of components according to an embodiment of the invention. The system 100 comprises user device 106 associated with the sender 102, a server computer 108, a wallet aggregator computer 110, a user device 112 associated with the receiver 104. In some embodiments, the server computer 108 is associated with a transfer service provider. In some embodiments, the system 100 may further include a processing network computer 114 and an authorizing entity computer 116. The authorizing entity computer 116 may be associated with a financial account of the receiver 104. Although not depicted, the system 100 may further include an authorizing entity computer associated with a financial account of the sender 102. The user device 106 may be in operative communication with the server computer 108. The server computer 108 may be in operative communication with the wallet aggregator computer 110 and the processing network computer 114 which may be in operative communication with the authorizing entity computer 116. The wallet aggregator computer 110 may be in further operative communication with the authorizing entity computer 116 and the user device 112.

The devices and/or computers of FIG. 1 may be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and/or devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

For simplicity of illustration, a certain number of components are shown in FIG. 1. It is understood, however, that embodiments of the invention may include more than one of each component.

At step 1, the user device 106 can transmit transfer data to the server computer 108 (e.g., via a transfer request message). The transfer data can include a mobile number and a name. In some embodiments, the transfer data can include other data capable of being used to identify the receiver such as, for example, an address, an email address, a country, a wallet identifier, a username, and/or the like. In some embodiments, the transfer data can additionally include an amount (corresponding to a particular form of currency associated with the sender such as USD) and an account identifier (e.g., a PAN associated with the sender 102) and/or any suitable identifier for the sender 102. In some embodiments, the transfer data may specify a currency type (e.g., USD) for the sender 102 and a currency type (e.g., CAD) of the receiver 104. In some embodiments, transfer data can be transmitted in a transfer data message. A transfer data message can be any suitable format.

Prior to transmitting the transfer data, the user device 106 may obtain the transfer data from the sender 102. By way of example, the user device 106 may be utilized to display user interface 118 at a display of the user device 106. In some embodiments, user interface 118 may be rendered by an application. As a non-limiting example, the user interface 118 can be rendered by a web browser accessing a webpage associated with a transfer service provider. As another examples, the user interface 118 can be rendered by an application hosted by the server computer 108 and associated with a transfer service provider. The sender 102 may provide his or her account information (including an account identifier, a routing number, etc.) at any suitable time. By way of example, the sender 102 may provide the server computer 108 his or her account information during a registration process and the server computer 108 may store the account information and/or the account information may be included in the transfer data transmitted at step 1.

At step 2, after receiving the transfer data from the user device 106, the server computer 108 can capture the transfer data. If an account identifier was not included in the transfer data, the server computer 108 can obtain the account identifier associated with the user by looking up the account identifier associated with the sender 102. In some embodiments, the server computer 108 can format the transfer data in any suitable manner. By way of example, the wallet aggregator computer 110 may communicate according to a particular communications protocol. Accordingly, the server computer 108 can format the transfer data according to the communications protocol associated with the wallet aggregator computer 110.

At step 3, after capturing and/or formatting the transfer data, the server computer 108 can transmit a verification request message to the wallet aggregator computer 110. In some embodiments, the wallet aggregator computer 110 may have previously registered and/or enrolled with the transfer service provider (e.g., via the process described in connection with FIG. 6). Accordingly, in some embodiments, the server computer 108 may identify the wallet aggregator computer 110 from one or more known wallet aggregator computers based at least in part on some portion of the transfer data (e.g., the mobile number, the country code of the mobile number, the area code of the mobile number, etc.). The verification request message (also referred to as "a verification request") may be in any suitable format. The verification request message can be transmitted from the server computer 108 to the wallet aggregator computer 110 via any suitable application programming interface (API) call. In some embodiments, the server computer 108 may store particular API calls to be utilized to transmit verification requests to particular wallet providers. The verification request message may request the wallet aggregator computer 110 to verify the receiver's information, such as mobile number and name. The verification request may also indicate and/or include a request for the receiver's account identifier (e.g., a PAN associated with the receiver 104).

At step 4, after receiving the verification request from the server computer 108, the wallet aggregator computer 110 can verify the receiver's information. In some embodiments, the receiver 104 may have previously registered/enrolled with the wallet aggregator computer 110.

By way of example, the wallet aggregator computer 110 may be a digital wallet provider. The receiver 104 may provider the wallet aggregator computer 110 his or her user information (including his or her account identifier) during a process for enrolling in a digital wallet service. The wallet aggregator computer 110 can store user information associated with each user (including the receiver 104) for which enrollment has occurred. This database may maintain the user information (e.g., name, address, phone number, account identifier, or any suitable information associated with the user and/or the user's account).

Upon receipt of the verification request, the wallet aggregator computer 110 can verify the receiver's mobile number and name by determining if the receiver's mobile number and name are stored in the database. In some embodiments, the wallet aggregator computer may verify that both the mobile number and the name provided in the verification request is associated with the same user within the database. After verifying the receiver's information, the wallet aggregator computer 110 can transmit a verification response message (also referred to as a verification response) to the server computer 108. The verification response can include an indication of whether or not the receiver's information was verified as well as the receiver's account identifier. In some embodiments, the verification response can be transmitted from the wallet aggregator computer 110 to the server computer 108 via a particular API. In some embodiments, the verification response can indicate a currency type associated with the receiver 104 (e.g., a currency type corresponding to the receiver's resident country, a preferred currency type previously designated by the receiver, etc.).

At step 5, after receiving the verification response, the server computer 108 can transmit a confirmation request to the first user device. The confirmation request may be in any suitable format. In some embodiments, the confirmation request may be transmitted to the user device 106 and displayed via an application operating on the user device 106 (e.g., a web browser, an application hosted by the server computer 108, etc.). The confirmation request may comprise a mobile number and a name. In some embodiments, the confirmation request may comprise additional data such as an address, an email address, a country, a wallet identifier, a username, and/or the like. The information transmitted in the confirmation request may be provided to the sender 102 via user interface 120. In some embodiments, user interface 120 may be rendered by an application operating at the user device 106 (e.g., a web browser, an application hosted by the server computer 108, etc.). The sender 102 operating the user device 106 may select to "send" or "cancel" the transfer, or other suitable selections. If "cancel" is selected, processing may cease and the server computer 108 may time out and discard the information received in the verification response.

At step 6, the user device 106 may transmit a cancellation indication in a confirmation response to indicate the transaction is cancelled. Upon receiving the cancellation indication, the server computer 108 may discard the information received in the verification response. However, if the sender 102 selects "send," the user device 106 may transmit a confirmation response including an indication that the transfer is to proceed. The server computer 108 can receive the confirmation response at step 6 and determine whether or not to transfer the funds from the sender's account to the receiver's account.

At step 7, when the indication received indicates the transfer is to proceed, the server computer 108 may initiate an account funding transaction (AFT). An AFT is a transaction designed to supply funds to another account such as a credit, prepaid, debit, ATM or on-line account. In some embodiments, an AFT message may be sent from the server computer 108 to an authorizing entity associated with the account identifier of the sender 102 (not depicted) via the processing network computer 114. In some embodiments, the AFT may be utilized to transfer funds corresponding to the amount indicated in the transfer data from the account of the sender 102 to an account associated with the transfer service provider associated with the server computer 108. This AFT can be used to pay the server computer's bank for sending funds to the recipient. In some embodiments, the AFT can be for an amount that includes the amount identified in the transfer data plus any suitable fees (e.g., a transfer fee, and/or a currency conversion fee, etc.) for facilitating the funds transfer between the sender 102 and the receiver 104 as specified by the transfer service provider. In some embodiments, the AFT results in a debit to the account associated with the sender 102 and a credit to the account associated with the transfer service provider.

In some embodiments, the AFT may be in the form of an authorization request message that includes an AFT indicator. The AFT indicator may be used in both the authorization and clearing and settlement transactions. Settlement takes place within two working days. Neither the authorization nor the clearing transaction carries any financial information about the recipient of a money transfer. The AFT carries only the account number associated with the payment card of the sender. An AFT is also accompanied by indicators, which allow the authorizing entity associated with the sender 102 to take appropriate authorization decisions. Indicators include channel information such as Mail Order/Telephone Order or Internet, and merchant type. In some embodiments, the processing network computer 114 performs currency conversion on AFT transactions when the currency of the sender 102 is different from the currency accepted by the transfer service provider associated with the server computer 108. AFT indicators can be used to differentiate funds transfers from standard purchase transactions. In some embodiments, the processing network computer 114 (e.g., performing a Verified by Visa Service) may authenticate the sender 102. In some embodiments, for security reasons, it may be preferable that only fully authenticated transactions are supported.

The following fields can be used in an AFT and can be supported in messages and clearing and settlement transactions. The key fields can include: Processing Code; Merchant Type; CAVV Result Code; Mail Order/Telephone Order/Electronic Commerce Indicator; Mail/Phone/Electronic Commerce Indicator; Transaction ID (XID); and TransStain/CAW Data. The messages used to support authorization VbV/AFT transactions are the following: authorization request messages, authorization response messages, and advice messages; full financial requests, responses, and advices; authorization reversal requests, authorization reversal responses, and reversal advices. Clearing and settlement may require a Transaction Code Qualifier be set to '1' for Account Funding Transactions. The clearing and settlement trancodes that may be needed to support authorization and SMS VbV/AFT transactions can include: Original Sales, Original Credits, Chargebacks, Representments and Reversals. In some embodiments, a reversal message can be sent prior to an agreed timeline that is stated in the money transfer portal web site. If the cardholder cancels a transfer, a reversal message can be processed via the processing network computer 114. In some embodiments, a specific Merchant Category Code (MCC) can be used.

At step 8, if the server computer 108 receives a response (e.g., from the processing network computer 114) that the AFT was successful, the server computer 108 can initiate an transaction (e.g., an OCT) by sending a transaction message (e.g., an OCT message) to the processing network computer 114 including the receiver's account identifier as received at step 4. In some embodiments, when the currency type of the transfer service provider does not match the currency type of the receiver 104, the server computer 108 can perform a currency conversion process to convert the amount indicated in the response to an amount corresponding to the currency type of the receiver 104. This currency conversion process may occur prior to initiating the transaction (e.g., the OCT).

Although an AFT message is discussed above as a mechanism for transferring funds, it should be appreciated that the transfer service provider can hold funds on behalf of the sender 102. These funds may be obtained by various means including, but not limited to, corporate treasury, an automated clearinghouse (ACH) pull, a wire pull, by cash deposit, and the like. Accordingly, in some embodiments, the server computer 108 may check a balance of funds held by the transfer service provider on behalf of the sender 102. If the balance exceeds the amount of the transfer, the server computer 108 can initiate the transaction message (e.g., the OCT message) without utilizing an AFT message at all.

At step 9, the processing network computer 114 may transmit the transaction message (e.g., the OCT message) to authorizing entity computer 116 (e.g., a computer operated by or on behalf of the receiver's bank). The transaction message may instruct to the recipient's issuer to credit the account of the recipient; step 8 is typically performed at the end of the business day.

In some embodiments, the transaction message may be an OCT (Original Credit Transaction) message. An OCT message may be used to perform a clearing and settlement credit transaction designed for use in business applications such as a business money transfer or business-to-consumer repayments. When used in the context of the present disclosure, the OCT can be utilized to perform a transaction for delivering funds to the recipient account. It is separate from, and takes place after, the funding transaction (e.g., an AFT transaction, if the an AFT was the funding transaction utilized). This timing may be utilized to ensure that payment funds are secured before funds are sent to the recipient. The OCT can include the account number of the recipient and no information about the sender. In some embodiments, the OCT message can be in the form of an authorization request message. In embodiments, a special indicator identifies an OCT to the authorizing entity computer 116. Interchange flows from the sender's bank to the receiver's bank, as in a normal purchase transaction. Settlement takes place within two days. Some issuers may delay finds availability for one to three days, so that further checks can take place.

Transaction data present on an original OCT can be transcribed unchanged onto related exception transactions including chargebacks and reversals. Establishing the ability to link the delivery of funds transactions to the funding transaction is also useful. OCTs originating from clearing and settlement connected acquirers are identified by a pre-determined Transaction Code Qualifier value. No authorizations will be processed for OCTs originating from clearing and settlement connected end points. Portal operators can leave the authorization field blank or fill it with zeros. The Electronic Commerce Indicator (ECI) can be included on all Internet OCTs. The ECI is required for all Internet transactions. The money transfer portal can use a specific Merchant Category Code (MCC) to indicate Financial Institutions-Merchandise and Services for both the AFT and OCT transactions. If the cardholder cancels an approved transaction, a reversal message can be processed via the clearing and settlement system or SMS. If the clearing and settlement transaction code indicates that a credit voucher has already been processed, then a clearing and settlement transaction code indicating credit voucher reversal can be processed.

Use of the OCT transaction generally assumes that the sender's bank and the recipient's bank are different banks. In that situation, the OCT transaction provides a convenient mechanism for money transfer. If the sender's bank and the recipient's issuer bank are the same bank, it is possible for that bank to simply perform an internal "on-us" credit posting to credit funds to the recipient's payment card. Nevertheless, it is entirely possible that when the sender's bank and the recipient's issuer bank are the same bank, that the bank will choose to execute an OCT transaction rather than use their internal systems. This situation can occur if it is more difficult for the bank to connect internal systems than it is to execute an OCT transaction.

The authorizing entity computer 116 can credit the recipient's account with the amount of the transferred funds indicated in the OCT message. In some embodiments, the time lag from the submission of the OCT transaction by the sender's bank to the actual credit of the recipient's card account can be approximately two days (e.g., 48 hours) or less.

Clearing and settlement can occur between the sender's bank and the recipient's issuer, i.e., the OCT leg of the transaction. Clearing and settling may occur within two business days. During the clearing and settlement process, the sender's issuer can bill the sender 102 for the remittance transaction (including any service fees and fees for foreign currency conversion). This billing step can be a standard transaction known the in art.

At step 10, the authorizing entity computer 116 can send a notification to the wallet aggregator computer 110 indicating that a transaction (e.g., an OCT) has been performed. In some embodiments, the wallet aggregator computer 110 can be operated by the same authorizing entity as the authorizing entity associated with the authorizing entity computer 116.

At step 11, the wallet aggregator computer 110 can transmit an alert to the user device 112. For example, the wallet aggregator computer 110 can transmit an alert (e.g., an alert indicating an OCT was received) to an application operating on the user device 112 (e.g., a wallet application hosted by the wallet aggregator computer 110). The alert can indicate that the receiver's account has been credited.

Figure 2:
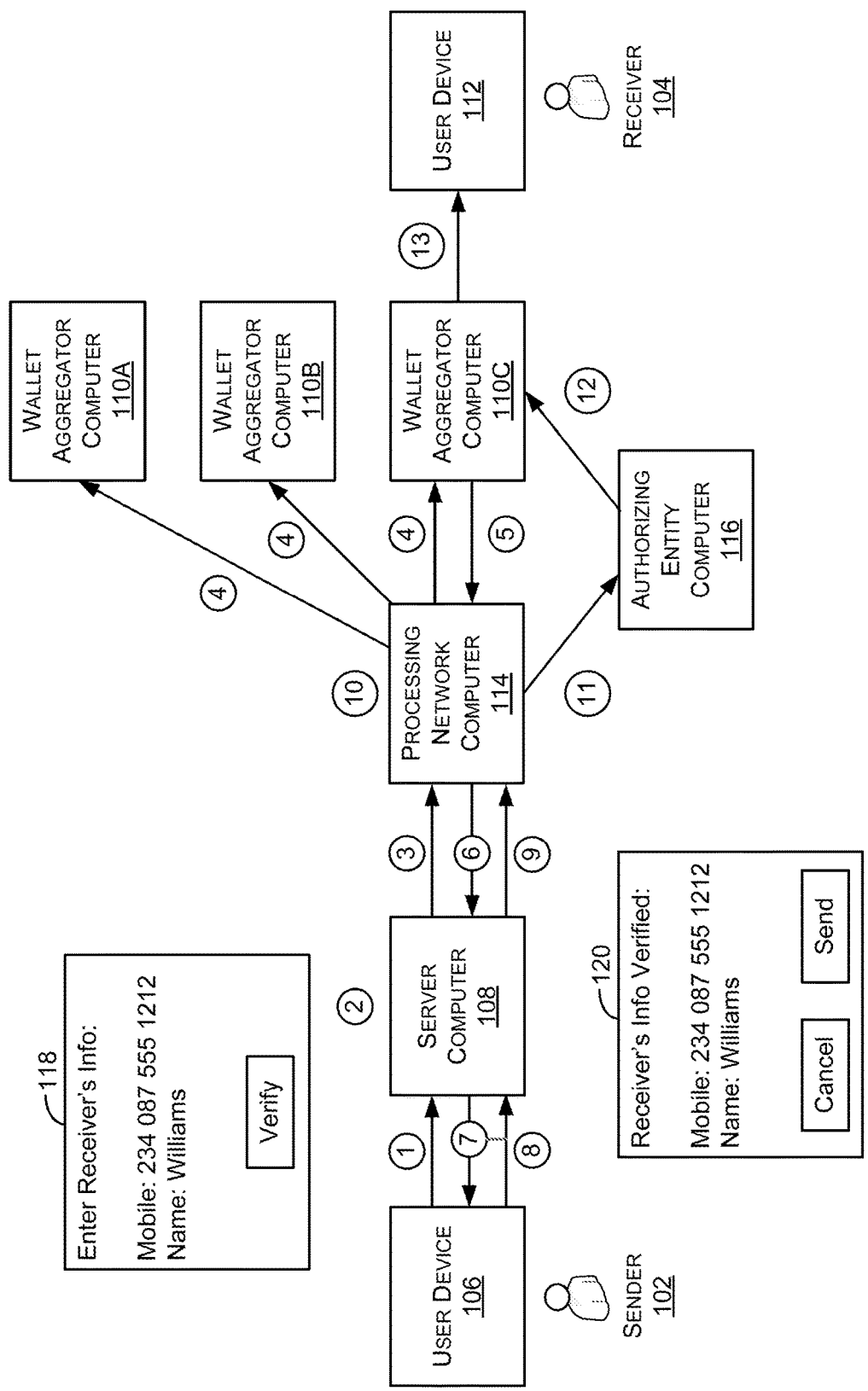
FIG. 2 shows a flow diagram of another exemplary method, in accordance with at least one embodiment.

FIG. 2 shows a flowchart of another system and method, according to at least one embodiment. Although the steps are illustrated in a specific order, it is understood that embodiments of the invention may include methods that have the steps in different orders. In addition, steps may be omitted or added and may still be within embodiments of the invention.

FIG. 2 includes a system 200 comprising a number of components according to an embodiment of the invention. The system 200 comprises the user device 106 operated by the sender 102, the server computer 108, the wallet aggregator computers 110A, 110B, and 110C, the user device 112 operated by the receiver 104, the processing network computer 114, and the authorizing entity computer 116. Although three wallet aggregator computers are presented in FIG. 2, any suitable number of wallet aggregator computers may be included in system 200. The wallet aggregator computers 110A-C may collectively be referred to as "the wallet aggregator computers 110." As depicted, the processing network computer 114 can be disposed between the server computer 108 and the wallet aggregate computers 110. In some embodiments, the wallet aggregator computers can each be a digital wallet provider and/or an aggregator of digital wallet provider data (e.g., mappings between name, phone number, and account numbers corresponding to one or more digital wallet providers). The authorizing entity computer 116 may be a computer operated by or on behalf of the authorizing entity associated with a financial account associated with the receiver 104. Each of the components provided in FIG. 2 may be operatively in communication with one another utilizing any suitable network.

At step 1, the user device 106 can transmit transfer data to the server computer 108. The transfer data can include a mobile number and a name (e.g., as obtained via user interface 118). In some embodiments, the transfer data can include other data capable of being used to identify the receiver such as, for example, an address, an email address, a country, a wallet identifier, a username, and/or the like. In some embodiments, the transfer data can additionally include an amount (corresponding to a particular form of currency associated with the sender such as USD) and an account identifier (e.g., a PAN associated with the sender 102) and/or any suitable identifier for the sender 102. In some embodiments, the transfer data may specify a currency type (e.g., USD) for the sender 102 and a currency type (e.g., CAD) of the receiver 104.

At step 2, after receiving the transfer data from the user device 106, the server computer 108 can capture the transfer data. If an account identifier was not included in the transfer data, the server computer 108 can obtain the account identifier associated with the user by looking up the account identifier associated with the sender 102. In some embodiments, the server computer 108 can format the transfer data in any suitable manner. By way of example, the processing network computer 114 and/or the wallet aggregator computer 110 may communicate according to a particular communications protocol. Accordingly, the server computer 108 can format the transfer data according to the communications protocol associated with the processing network computer 114 and/or the wallet aggregator computers 110.

At step 3, after capturing and/or formatting the transfer data, the server computer 108 can transmit a verification request message to the processing network computer 114. In some embodiments, each of the wallet aggregator computers 110 may have previously registered and/or enrolled with the processing network computer 114. In some embodiments, the processing network computer 114 may be configured to transmit the verification request message to all known wallet aggregator computers. The verification request message (also referred to as "a verification request") may be in any suitable format. The verification request message can be transmitted via any suitable application programming interface (API) call. In some embodiments, the processing network computer 114 may store particular API calls to be utilized to transmit verification requests to particular wallet providers. The verification request message may request the wallet aggregator computer 110 to verify the receiver's information, such as mobile number and name. The verification request may also indicate and/or include a request for the receiver's account identifier (e.g., a PAN associated with the receiver 104).

At step 4, the wallet aggregator computers 110 can each receive the verification request message and verify the receiver's information based on the data provided in the request (e.g., the mobile number, the name, etc.). In some embodiments, the receiver 104 may have previously registered/enrolled with the wallet aggregator computer 110C.

In some embodiments, each of the wallet aggregator computers 110 may be a digital wallet provider. The receiver 104 may provider the wallet aggregator computer 110C his or her user information (including his or her account identifier) during a process for enrolling in a digital wallet service. The wallet aggregator computer 110C can store user information associated with each user (including the receiver 104) for which enrollment has occurred. This database may maintain the user information (e.g., name, address, phone number, account identifier, or any suitable information associated with the user and/or the user's account). Wallet aggregator computers 110A and 110B can similarly store such data for users that have registered with wallet aggregator computers 110A and 110B, respectively.

Upon receipt of the verification request, each wallet aggregator computer can attempt verify the receiver's mobile number and name by determining if the receiver's mobile number and name are stored in its corresponding database. In some embodiments, the wallet aggregator computer 110C may verify that both the mobile number and the name provided in the verification request message is associated with the user within its database. After verifying the receiver's information, the wallet aggregator computer 110C can transmit a verification response message (also referred to as a verification response) to the processing network computer 114. The verification response can include an indication of whether or not the receiver's information was verified and/or the receiver's account identifier. In some embodiments, the verification response can be transmitted from the wallet aggregator computer 110C to the processing network computer 114 via a particular API. In some embodiments, the verification response can indicate a currency type associated with the receiver 104 (e.g., a currency type corresponding to the receiver's resident country, a preferred currency type previously designated by the receiver, etc.).

At step 5, the processing network computer 114 can receive the verification response message and at step 6 the processing network computer 114 may transmit a confirmation request to the server computer 108 which in turn may transmit the confirmation request to the user device 106 at step 7. The confirmation request may be in any suitable format. In some embodiments, the confirmation request may be transmitted to the user device 106 via the server computer 108 and displayed via an application operating on the user device 106 (e.g., a web browser, an application hosted by the server computer 108, etc.). The confirmation request may comprise the mobile number and the name. In some embodiments, the confirmation request may comprise additional data such as an address, an email address, a country, a wallet identifier, a username, and/or the like depending on the transfer data provided at step 1. The information transmitted in the confirmation request may be provided to the sender 102 via user interface 120.

At step 8, the user device 106 may transmit a cancellation indication in a confirmation response to indicate the transaction is cancelled. Upon receiving the cancellation indication, the server computer 108 may discard the information received in the verification response. However, if the sender 102 selects "send," the user device 106 may transmit a confirmation response including an indication that the transfer is to proceed. The server computer 108 can receive the confirmation response and determine whether or not to transfer the funds from the sender's account to the receiver's account.

At step 9, when the indication received indicates the transfer is to proceed, the server computer 108 may transmit the confirmation response to the processing network computer 114.

At step 10, the processing network computer 114 can initiate an account funding transaction (AFT) by transmitting an AFT message to an authorizing entity associated with the account identifier of the sender 102. In some embodiments, the AFT may be utilized to transfer funds corresponding to the amount indicated in the transfer data from the account of the sender 102 to an account associated with the transfer service provider associated with the server computer 108. This AFT can be pay the server computer's bank for sending funds to the recipient. In some embodiments, the AFT can be for an amount that includes the amount identified in the transfer data plus any suitable fees (e.g., a transfer fee, and/or a currency conversion fee, etc.) for facilitating the funds transfer between the sender 102 and the receiver 104 as specified by the transfer service provider. In some embodiments, the AFT results in a debit to the account associated with the sender 102 and a credit to the account associated with the transfer service provider. In some embodiments, the AFT may be in the form of an authorization request message that includes an AFT indicator.

Although an AFT message is discussed above as a mechanism for transferring funds, it should be appreciated that the transfer service provider can hold funds on behalf of the sender 102. These funds may be obtained by various means including, but not limited to, corporate treasury, an automated clearinghouse (ACH) pull, a wire pull, by cash deposit, and the like. Accordingly, in some embodiments, the server computer 108 may check a balance of funds held by the transfer service provider on behalf of the sender 102. If the balance exceeds the amount of the transfer, the server computer 108 can initiate a transaction message (e.g., an OCT message) without utilizing an AFT message.

At step 11, if the server computer 108 receives a response that the AFT was successful (or determines the balance associated with the sender 102 exceeds the amount of the transfer), the processing network computer 114 can initiate a transaction (e.g., an OCT) by sending a transaction message (e.g., an OCT message) to authorizing entity computer 116 (e.g., a computer operated by or on behalf of the receiver's bank). The transaction message (e.g., the OCT message) may instruct to the recipient's issuer to credit the account of the recipient. The authorizing entity computer 116 can credit the recipient's account with the amount of the transferred funds indicated in the transaction message (e.g., an OCT message). In some embodiments, the time lag from the submission of the transaction (e.g., the OCT) by the sender's bank to the actual credit of the recipient's card account can be approximately two days (e.g., 48 hours) or less. Clearing and settlement can occur between the sender's bank and the recipient's issuer. During the clearing and settlement process, the sender's issuer can bill the sender 102 for the remittance transaction (including any service fees and fees for foreign currency conversion). This billing step can be a standard transaction known the in art.

At step 12, the authorizing entity computer 116 can send a notification to the wallet aggregator computer 110C indicating that a transaction message (e.g., an OCT message) has been received and/or the receiver's account has been credited. In some embodiments, the wallet aggregator computer 110C can be operated by the same authorizing entity as the authorizing entity associated with the authorizing entity computer 116.

At step 13, the wallet aggregator computer 110C can transmit an alert to the user device 112. For example, the wallet aggregator computer 110 can transmit an alert (e.g., an OCT-received transaction alert indicating an OCT has been received) to an application operating on the user device 112 (e.g., a wallet application hosted by the wallet aggregator computer 110C). The alert can indicate that the receiver's account has been credited.

Figure 3:
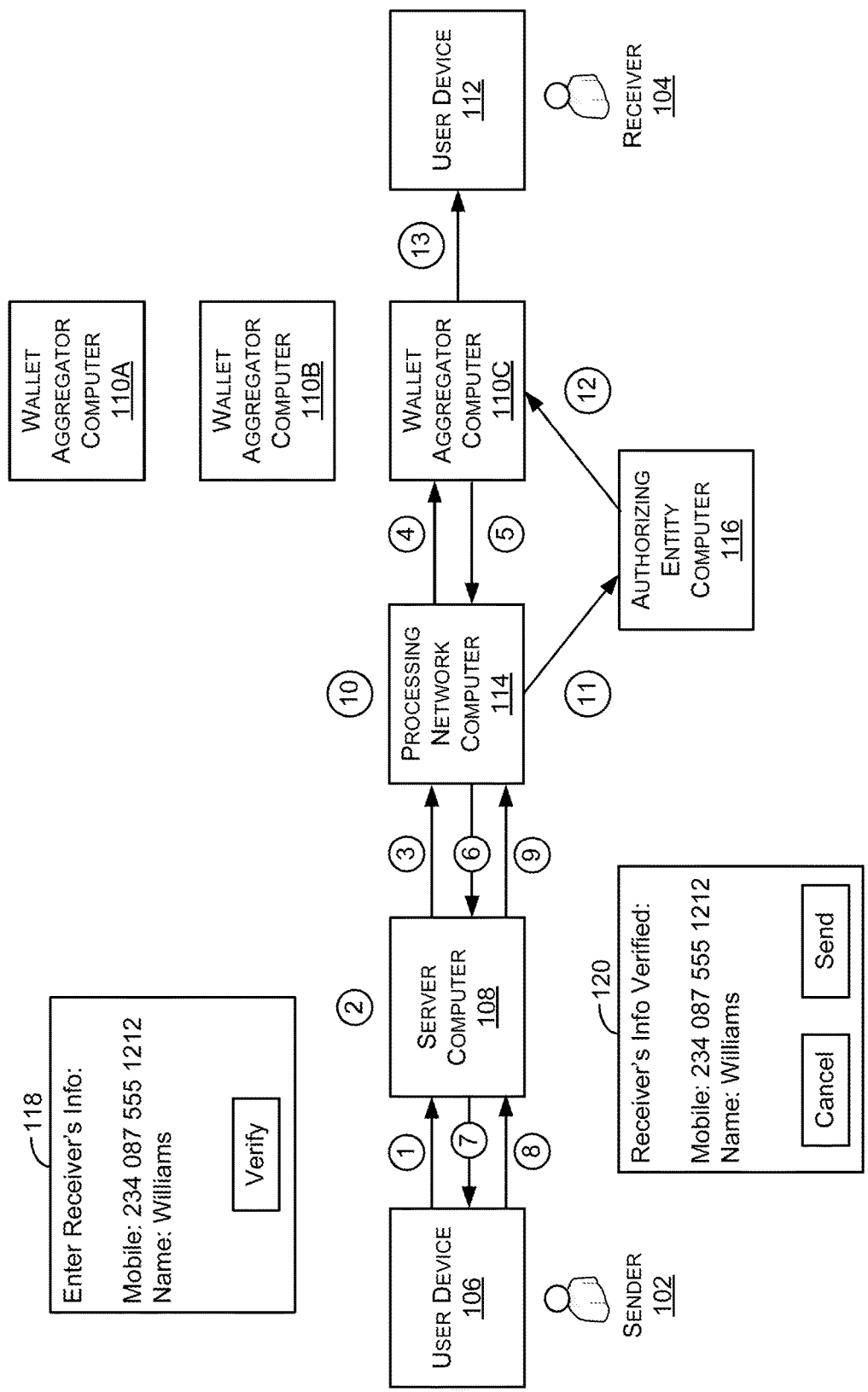
FIG. 3 shows a flow diagram of yet another exemplary method, in accordance with at least one embodiment.

FIG. 3 shows a flowchart of yet another system and method, according to at least one embodiment. Although the steps are illustrated in a specific order, it is understood that embodiments of the invention may include methods that have the steps in different orders. In addition, steps may be omitted or added and may still be within embodiments of the invention.

FIG. 3 includes a system 300 that is substantially similar to system 200. Steps 1 and 2 of FIG. 3 are substantially similar to steps 1 and 2 of FIG. 2 and will not be repeated here.

At step 3, after capturing and/or formatting the transfer data, the server computer 108 can transmit a verification request message to the processing network computer 114. In some embodiments, each of the wallet aggregator computers 110 may have previously registered and/or enrolled with the processing network computer 114. Accordingly, in some embodiments, the processing network computer 114 may be configured to identify a set of one or more wallet aggregator computers from the wallet aggregator computers 110 to which to direct the verification request message. This identification can be based at least in part on some portion of the transfer data (e.g., the mobile number, the country code of the mobile number, the area code of the mobile number, etc.). As a non-limiting example, as part of the registration process the processing network computer 114 can store associations between each wallet aggregator computer 110A-C and their corresponding countries, country codes, area codes, or the like. When a verification request message is received by the processing network computer 114, the processing network computer 114 may utilize the phone number, for example, to identify one or more wallet aggregator computers. In the example, depicted, the processing network computer 114 can identify the verification request as being associated with the wallet aggregator computer 110C based on each of the wallet aggregator computer 110C being associated with a country code "234." It should be appreciated that while depicted as being sent to only one wallet aggregator computer, a verification request may be sent to one or more wallet aggregator computers (e.g., wallet aggregator computers all associated with a particular county, country code, area node, etc.). In the example depicted, the processing network computer 114 may be configured to transmit the verification request message to the wallet aggregator computer 110C. The verification request message (also referred to as "a verification request") may be in any suitable format. The verification request message can be transmitted via any suitable application programming interface (API) call. In some embodiments, the processing network computer 114 may store particular API calls to be utilized to transmit verification requests to particular wallet providers. The verification request message may request the wallet aggregator computer 110 to verify the receiver's information, such as mobile number and name. The verification request may also indicate and/or include a request for the receiver's account identifier (e.g., a PAN associated with the receiver 104).

At step 4, the wallet aggregator computers 110C can receive the verification request message and verify the receiver's information based on the data provided in the request (e.g., the mobile number, the name, etc.). In some embodiments, the receiver 104 may have previously registered/enrolled with the wallet aggregator computer 110C.

Steps 5-13 of FIG. 3 are substantially similar to steps 5-13 of FIG. 2 and will not be repeated here.

Figure 4:
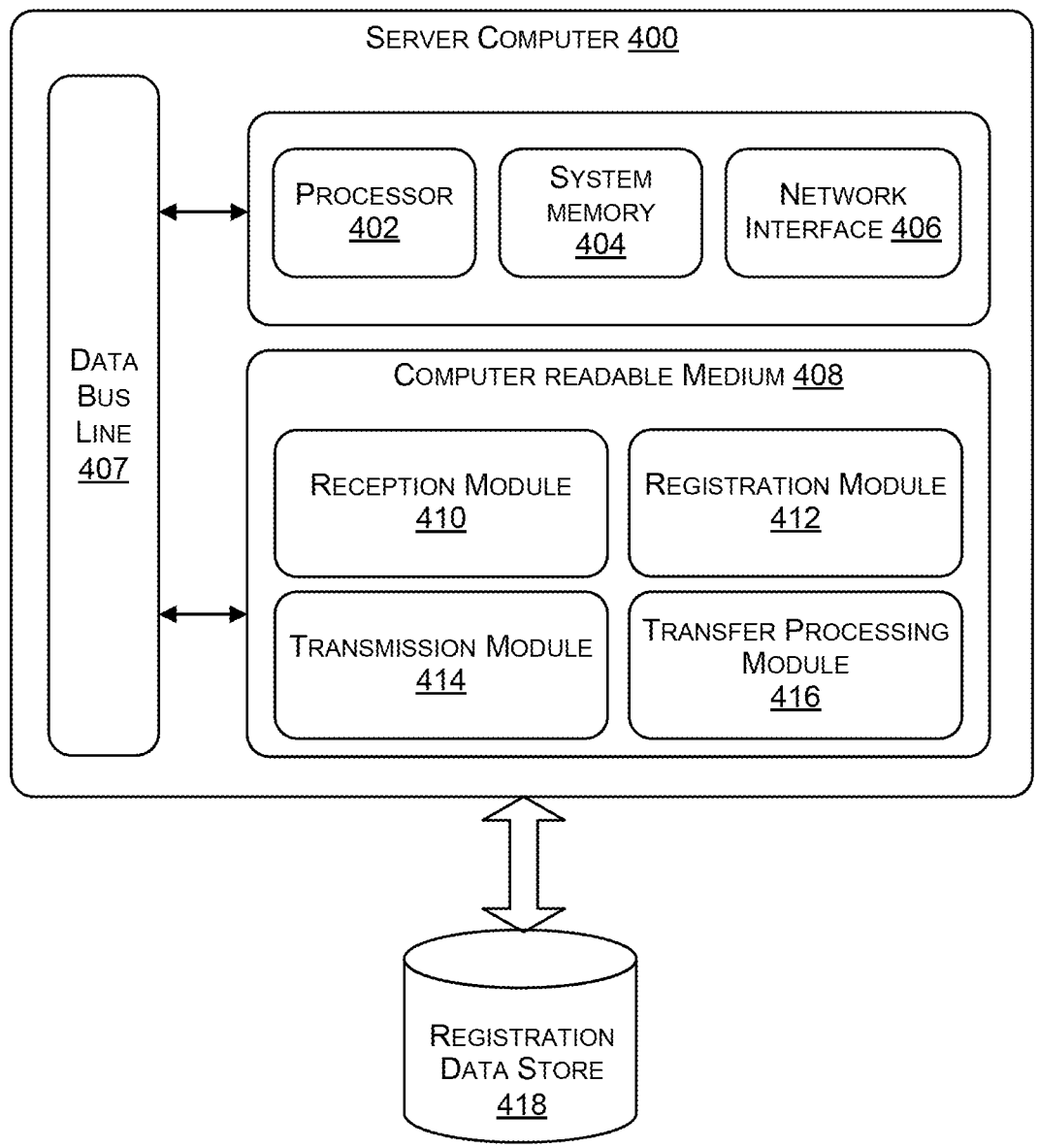
FIG. 4 shows a block diagram of a server computer, in accordance with at least one embodiment.

FIG. 4 shows a block diagram of components of a server computer 400 according to at least one embodiment. The server computer 400 may be an example of the server computer 108 of FIGS. 1-3. The exemplary server computer 400 may comprise a processor 402, operatively coupled to system memory 404, a network interface 406, and a computer readable medium 408 (e.g., via data bus line 407).

The computer readable medium 408 may comprise code, executable by the processor 402. The computer readable medium 408 may contain any number of applications, modules, and code. The computer readable medium 408 may comprise code, executable by the processor 402, to implement the methods described herein.

The memory 404 may store data such as an operating system. The network interface 406 may include an interface that can allow the server computer 400 to communicate with external computers. For example, the network interface 406 may comprise a contact, Bluetooth or Wi-Fi interface.

In some embodiments, the computer readable medium 408 may store instructions corresponding to a reception module 410, a registration module 412, and a transmission module 414, and a transfer processing module 416.

The reception module 410 may include instructions that, when executed by the processor 402 cause the processor 402 to receive any suitable data from any suitable external source. By way of example, the processor 402 may receive transfer data (e.g., from a user device such as the user device 106 of FIGS. 1-3). The transfer data may be received in any suitable message (e.g., a transfer request message) according to any suitable format. In some embodiments, the reception module 410 may cause the processor 402 to receive a verification response message (e.g., from the wallet aggregator computer 110 of FIG. 1, from the processing network computer 114 of FIGS. 2 and 3, etc.). The verification response message may be in any suitable format. In some embodiments, the verification response message may include some portion of the transfer data previously received in a transfer data request message and account identifier for which the transfer data was associated. In some embodiments, the verification response message may indicate that the transfer data was verified (e.g., determined to be valid, matched the data stored by the wallet aggregator computer) or not verified (e.g., determined to be invalid, not found, etc.). In some embodiments, the reception module 410 can comprise code that when executed causes the processor 402 to receive a confirmation response message (e.g., from the user device 106 of the FIGS. 1-3). The confirmation response message may be in any suitable format and may include an indication that the transfer corresponding to the transfer data is to proceed or be cancelled.

The registration module 412 may include instructions that, when executed by the processor 402 cause the processor 402 to provide one or more interfaces with which registration information corresponding to one or more wallet aggregators (e.g., corresponding to the wallet aggregator computers 110 of FIGS. 1-3) can be collected. The interfaces may be any suitable form. As a non-limiting example, the registration information can include any suitable information such a wallet aggregator identifier, a country, country code, area code, or the like associated with a particular wallet aggregator. In some embodiments, execution of the code of the registration module 412 may cause the processor 402 to store received registration information in registration data store 418, a data store at, or accessible to, the server computer 400.

The transmission module 414 may include instructions that, when executed by the processor 402 cause the processor 402 to transmit any suitable data to any suitable external destination. By way of example, the processor 402 may transmit verification request messages to any suitable destination (e.g., the processing network computer 114 of FIGS. 2 and 3, the wallet aggregator computer 110 of FIG. 1, etc.). The verification request message may be in any suitable format. In some embodiments, the verification request message may include some portion of the transfer data previously received in the transfer data request message (e.g., received from a user device such as the user device 106 of FIGS. 1-3). In some embodiments, the transmission module 414 can comprise code that when executed causes the processor 402 to transmit a confirmation request message (e.g., to the user device 106 of the FIGS. 1-3). The confirmation request message may be in any suitable format and may include at least some portion of the transfer data and the account identifier, if one was received in a verification response message.

The transfer processing module 416 may include instructions that, when executed by the processor 402 cause the processor 402 to process a transfer. By way of example, the processor 402 may format and transmit an AFT message as described in the above figures to an authorizing entity corresponding to the user who has initiated the transfer (e.g., the sender 102). The transfer processing module 416 may utilize any suitable data such as an account number associated with the requesting user to identify the authorizing entity. The processor 402 may be further configured to receive an AFT message from the authorizing entity computer. In some embodiments, the AFT message may include an indication of whether a transfer of funds between an account of the sender and an account of the transfer service provider associated with the server computer 400 was successful or unsuccessful. If unsuccessful, the transfer processing module 416 may cause the processor 402 to cease processing the transfer. If the AFT was successful, the transfer processing module 416 may cause the processor 402 to transmit a transaction message (e.g., an OCT message) to any suitable destination (e.g., to the processing network computer 114 of FIG. 1). In some embodiments, the transaction message (e.g., the OCT message) may include some portion of the transfer data previously received in the transfer request message (e.g., received from a user device such as the user device 106 of FIGS. 1-3). The transaction message (e.g., the OCT message) may indicate instructions for an authorizing entity to credit a receiver (e.g., the receiver 104 of the FIGS. 1-3) with an amount identified in the transaction message. In some embodiments, the transfer processing module 416 may cause the processor 402 to perform any suitable conversion process for converting an amount received in the AFT (or previously held funds associated with the sender 102) from one currency type (e.g., a currency type associated with the transfer service provider) to another currency type (e.g., a currency type associated with the authorizing entity and/or the receiver 104).

Figure 5:
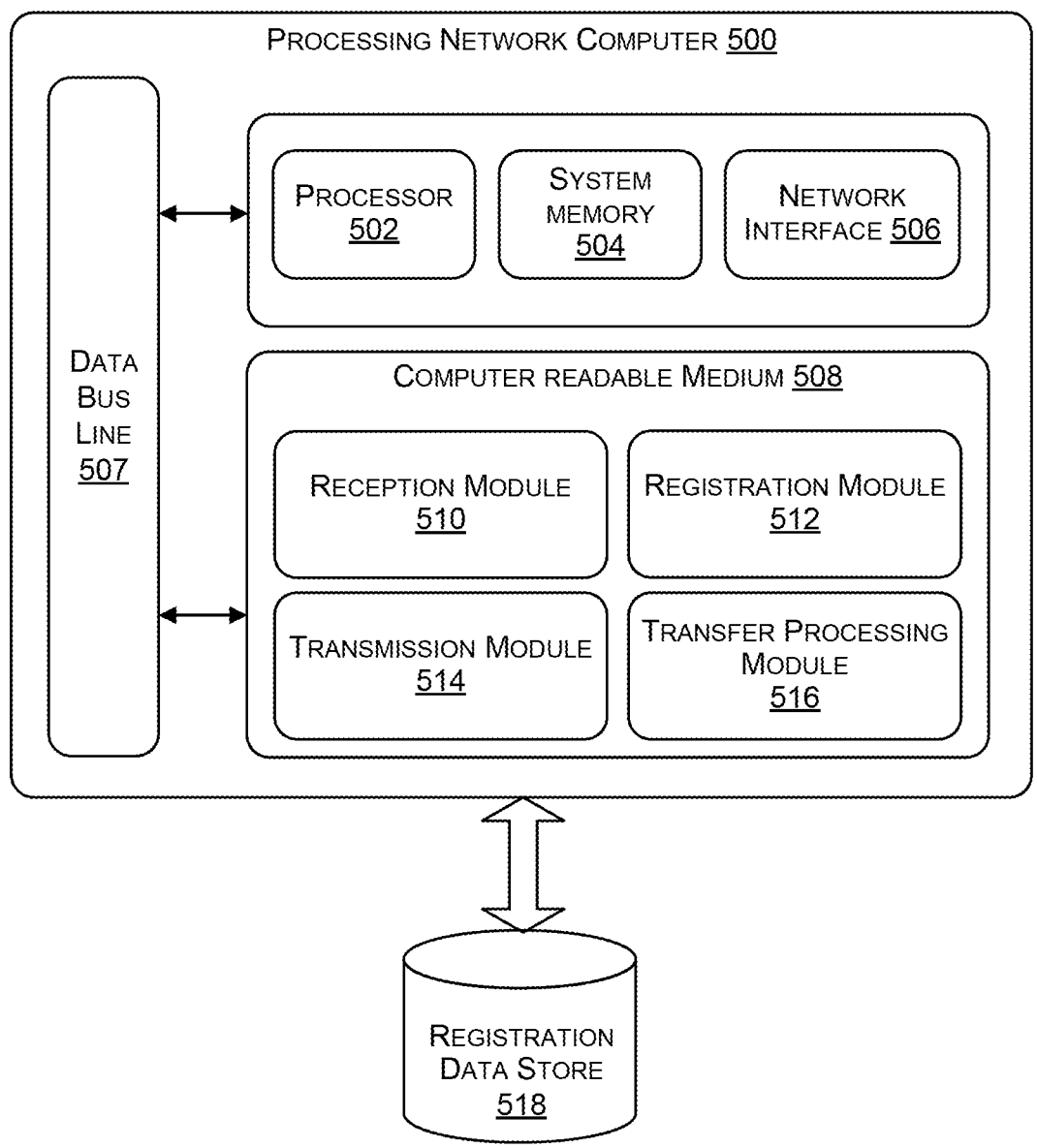
FIG. 5 shows a block diagram of a processing network computer, in accordance with at least one embodiment.

FIG. 5 shows a block diagram of components of a processing network computer 500 according to at least one embodiment. The processing network computer 500 may be an example of the processing network computer 114 of FIGS. 1-3. The processing network computer 500 may comprise a processor 502, operatively coupled to system memory 504, a network interface 506, and a computer readable medium 508 (e.g., via data bus line 507).

The computer readable medium 508 may comprise code, executable by the processor 502. The computer readable medium 508 may contain any number of applications, modules, and code. The computer readable medium 508 may comprise code, executable by the processor 502, to implement the methods described herein.

The memory 504 may store data such as an operating system. The network interface 506 may include an interface that can allow the processing network computer 500 to communicate with external computers. For example, the network interface 506 may comprise a contact, Bluetooth or Wi-Fi interface.

In some embodiments, the computer readable medium 508 may store instructions corresponding to a reception module 510, a registration module 512, and a transmission module 514, and a transfer processing module 516. In some embodiments, the processing network computer 500 include data processing subsystems, modules, networks, and operations used to support and deliver authorization services, exception file services, and clearing and settlement services provided as part of a processing network. These data processing components are not discussed in connection with FIG. 5.

The reception module 510 may include instructions that, when executed by the processor 502 cause the processor 502 to receive any suitable data from any suitable external source. By way of example, the processor 502 may receive transfer data (e.g., from a user device such as the user device 106 of FIGS. 1-3 via a server computer such as the server computer 400 of FIG. 4). The transfer data may be received in any suitable message (e.g., a transfer request message) according to any suitable format. In some embodiments, the reception module 510 may cause the processor 502 to receive a verification response message (e.g., from one or more of the wallet aggregator computers 110 of FIG. 2 or 3). The verification response message may be in any suitable format. In some embodiments, the verification response message may include some portion of the transfer data previously received in a transfer data request message and account identifier with which the transfer data was determined to be associated. In some embodiments, the verification response message may indicate that the transfer data was verified (e.g., determined to be valid, matched the data stored by the wallet aggregator computer) or not verified (e.g., determined to be invalid, not found, etc.). In some embodiments, the reception module 510 can comprise code that when executed causes the processor 502 to receive a confirmation response message (e.g., from the user device 106 of the FIGS. 1-3 via the server computer 400 of FIG. 4). The confirmation response message may be in any suitable format and may include an indication that the transfer corresponding to the transfer data is to proceed or be cancelled.

The registration module 512 may include instructions that, when executed by the processor 502 cause the processor 502 to provide one or more interfaces with which registration information corresponding to one or more wallet aggregators (e.g., corresponding to the wallet aggregator computers 110 of FIGS. 1-3) can be collected. The interfaces may be any suitable form. As a non-limiting example, the registration information can include any suitable information such a wallet aggregator identifier, a country, country code, area code, or the like associated with a particular wallet aggregator. In some embodiments, execution of the code of the registration module 512 may cause the processor 502 to store received registration information in registration data store 518, a data store at, or accessible to, the processing network computer 500.

The transmission module 514 may include instructions that, when executed by the processor 502 cause the processor 502 to transmit any suitable data to any suitable external destination. By way of example, the processor 502 may transmit verification request messages to any suitable destination (e.g., the wallet aggregator computers 110 of FIGS. 2 and/or 3, etc.). The verification request message may be in any suitable format. In some embodiments, the verification request message may include some portion of the transfer data previously received in the transfer data request message. In some embodiments, the transmission module 514 can comprise code that when executed causes the processor 502 to transmit a confirmation request message (e.g., to the user device 106 via the server computer 108 of FIGS. 2 and/or 3). The confirmation request message may be in any suitable format and may include at least some portion of the transfer data and the account identifier, if one was received in a verification response message.

The transfer processing module 516 may include instructions that, when executed by the processor 502 cause the processor 502 to process a transfer. By way of example, the processor 502 may format and transmit an AFT message as described in the above figures to an authorizing entity corresponding to the user who has initiated the transfer (e.g., the sender 102). The transfer processing module 516 may utilize any suitable data such as an account number associated with the requesting user to identify the authorizing entity. The processor 502 may be further configured to receive an AFT message from the authorizing entity computer (and/or from a server computer such as the server computer 108 of FIG. 1). In some embodiments, the AFT message may include an indication of whether a transfer of funds between an account of the sender and an account of the transfer service provider was successful or unsuccessful. If unsuccessful, the transfer processing module 516 may cause the processor 502 to cease processing the transfer. If the AFT was successful, the transfer processing module 516 may cause the processor 502 to transmit a transaction message (e.g., an OCT message) to any suitable destination (e.g., to the authorizing entity computer 116 of FIG. 1-3). In some embodiments, the transaction message (e.g., the OCT message) may include some portion of the transfer data previously received in the transfer request message (e.g., received from a user device such as the user device 106 of FIGS. 1-3). The transaction message (e.g., the OCT message) may indicate instructions for an authorizing entity to credit a receiver (e.g., the receiver 104 of the FIGS. 1-3) with an amount identified in the transaction message. In some embodiments, the transfer processing module 516 may cause the processor 502 to perform any suitable conversion process for converting an amount received in the AFT (or an amount of previously held funds) from one currency type (e.g., a currency type associated with the transfer service provider) to another currency type (e.g., a currency type associated with the authorizing entity and/or the receiver 104).

Figure 6:
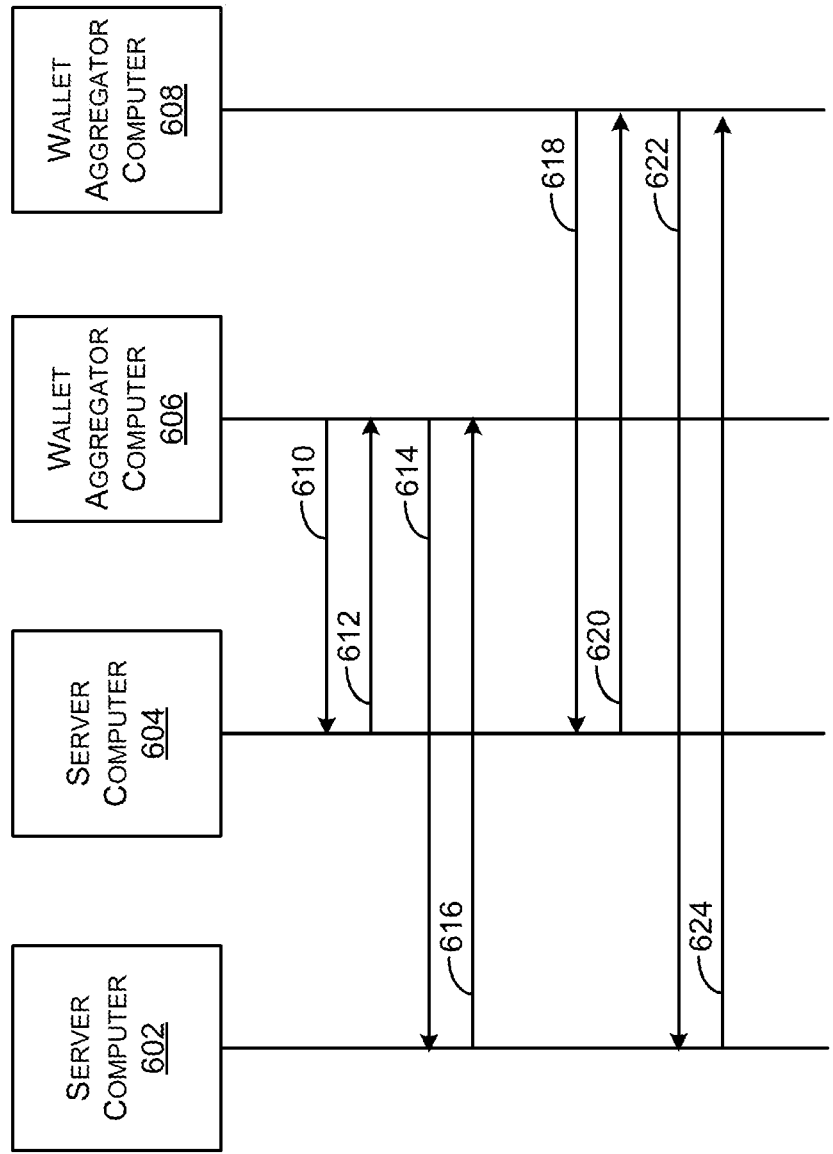
FIG. 6 shows a swim diagram depicting an exemplary method for performing registration process, in accordance with at least one embodiment.

FIG. 6 shows a swim diagram depicting an exemplary method 600 for performing registration process, in accordance with at least one embodiment. The method 600 can be performed by a server computer 602, a server computer 604, a wallet aggregator computer 606, and a wallet aggregator computer 608. It should be appreciated that more or fewer computer can be utilized. The server computers 602 and 602 may each be an example of the server computer 108 of FIGS. 1-3 and/or server computer 400 of FIG. 4. The wallet aggregator computers 606 and 608 may each be an example of the wallet aggregator computer 110 of FIGS. 1-3. The wallet aggregator computers 606 and 608 may be digital wallet providers in the same or different countries. The server computers 602 and 604 may correspond with differing transfer service providers in the same or different countries as those of the wallet aggregator computers.

The method 600 may begin at 610, where the wallet aggregator computer 606 may transmit registration information to the server computer 604. The registration information may include, but is not limited to, a wallet aggregator identifier for the wallet aggregator provider and/or computer, a country, country code, area code, address, region, or the like corresponding with accounts managed by the wallet aggregator. In some embodiments, the wallet aggregator computer 606 may present one or more interfaces hosted by the server computer 604 with which registration information may be collected. In some embodiments, the registration information may be transmitted via any suitable message such as a registration request message. In some embodiments, the registration information may be sent via a particular application programming interface associated with the registration process.

At 612, the server computer 604 may be configured to store the registration information in a data store for subsequent use. The server computer 604 can transmit a response to the registration request. The response may be transmitted via any suitable message such as a registration response message. The registration response message may be in any suitable format and may include an indicator confirming that the registration request has been successfully or unsuccessfully processed.

At 614, the wallet aggregator computer 606 may initiate a similar registration process with the server computer 602 by transmitting its registration information to the server computer 602. In some embodiments, the wallet aggregator computer 606 may present one or more interfaces hosted by the server computer 602 with which registration information may be collected. The server computer 602 may correspond to a different transfer service provider than the transfer service provider associated with the server computer 604.

At 616, the server computer 602 may store the registration information in a data store for subsequent use. The server computer 602 can transmit a response to the registration request. The response may be transmitted via any suitable message such as a registration response message. The registration response message may be in any suitable format and may include an indicator confirming that the registration request has been successfully or unsuccessfully processed. Thus, it is possible that each wallet aggregator can register with one or more than one transfer service via one or more than one server computers.

The functionality performed at 618-624 is substantially similar to that performed at 610-616 but with respect to the wallet aggregator computer 608. The each server computer may also store registration data corresponding to multiple wallet aggregator computers.

Figure 7:
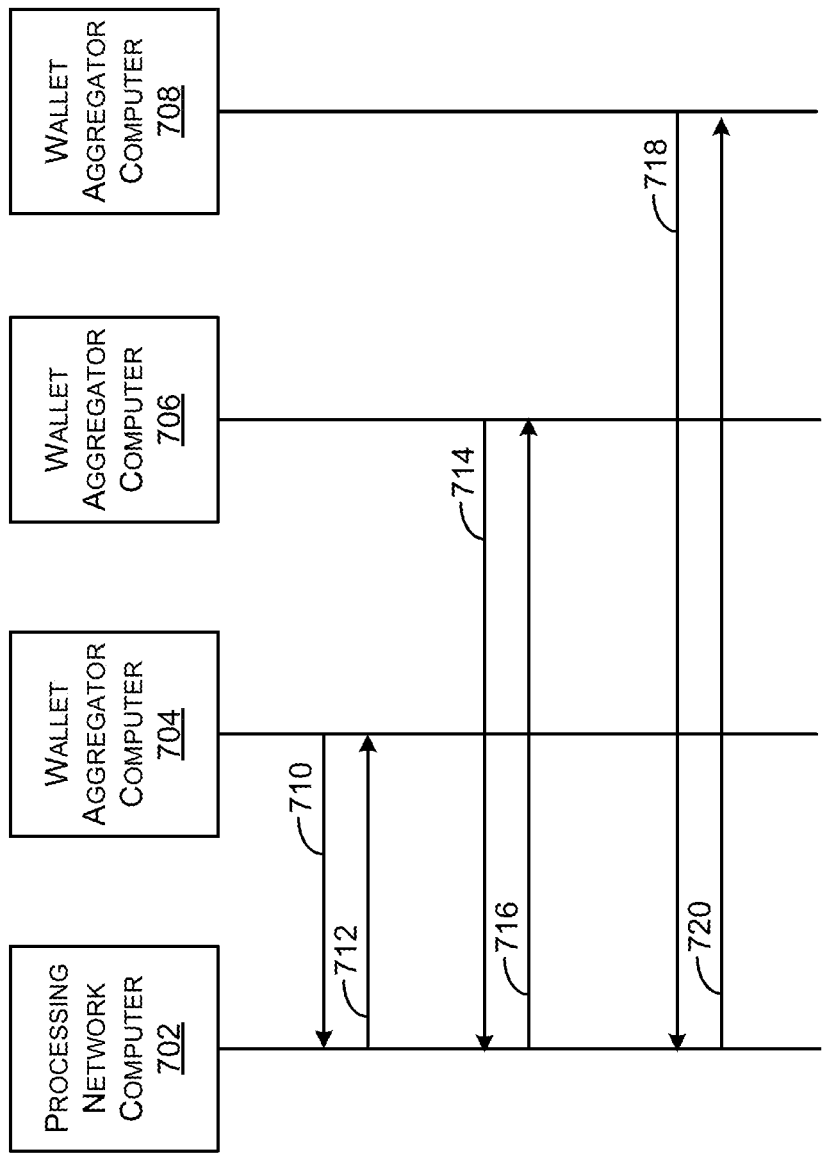
FIG. 7 shows a swim diagram depicting another exemplary method for performing a registration process, in accordance with at least one embodiment.

FIG. 7 shows a swim diagram depicting another exemplary method 700 for performing a registration process, in accordance with at least one embodiment. The method 700 can be performed by a processing network computer 702 and one or more wallet aggregator computers (e.g., wallet aggregator computers 704-708). It should be appreciated that more or fewer computer can be utilized. The processing network computer 702 may be an example of the processing network computer 114 of FIGS. 2 and 3 and/or processing network computer 500 of FIG. 5. The wallet aggregator computers 704-708 may each be an example of the wallet aggregator computers 110 of FIGS. 1-3. The wallet aggregator computers 704-708 may be digital wallet providers in the same or differing countries.

The method 700 may begin at 710, where the wallet aggregator computer 704 may transmit registration information to the processing network computer 702. The registration information may include, but is not limited to, a wallet aggregator identifier for the wallet aggregator provider and/or computer, a country, country code, area code, address, region, or the like corresponding with accounts managed by the wallet aggregator. In some embodiments, the wallet aggregator computer 704 may present one or more interfaces hosted by the processing network computer 702 with which registration information may be collected. In some embodiments, the registration information may be transmitted via any suitable message such as a registration request message. In some embodiments, the registration information may be sent via a particular application programming interface associated with the registration process.

At 712, the processing network computer 702 may be configured to store the registration information in a data store for subsequent use. The processing network computer 702 can transmit a response to the registration request. The response may be transmitted via any suitable message such as a registration response message. The registration response message may be in any suitable format and may include an indicator confirming that the registration request has been successfully or unsuccessfully processed.

At 714, the wallet aggregator computer 706 may initiate a similar registration process with the processing network computer 702 by transmitting its registration information to the processing network computer 702. In some embodiments, the wallet aggregator computer 706 may present one or more interfaces hosted by the processing network computer 702 with which registration information may be collected.

At 716, the processing network computer 702 may store the registration information in a data store for subsequent use. The processing network computer 702 can transmit a response to the registration request. The response may be transmitted via any suitable message such as a registration response message. The registration response message may be in any suitable format and may include an indicator confirming that the registration request has been successfully or unsuccessfully processed.

At 718 and 720, a similar process may be performed with respect to wallet aggregator computer 708 and processing network computer 702. Thus, it is possible that the processing network computer 702 can maintain registration information corresponding with any suitable number of wallet aggregator providers.

Technical Advantages

Embodiments of the invention provide for a number of advantages. For example, the receive-side experience may be improved as receivers would no longer be required to stand in line to claim their funds from transfer agents. Additionally, transfer service providers may be managed separate from the wallet aggregators alleviating the need for transfer service providers to manage maintaining data of many receiver accounts. Furthermore, the latency in the fund transfer process may be reduced for international transfers utilizing the techniques described herein.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by a server computer located in a first country from a first user device located in the first country, transfer data regarding a receiver operating a second user device located in a second country, the transfer data comprising a mobile number and a name;
   transmitting, by the server computer to a processing network computer, a verification request message, wherein the verification request message comprises the mobile number and the name, wherein transmitting the verification request message to the processing network computer causes the processing network computer to transmit the verification request message to a wallet aggregator computer located in the second country, the wallet aggregator computer maintaining a plurality of account identifiers aggregated from a plurality of digital wallet providers of the second country;
   receiving, by the server computer via the processing network computer, a verification response message initiated by the wallet aggregator computer, the verification response message comprising an account identifier of the receiver;
   transmitting, by the server computer, a confirmation request message to the first user device;
   receiving, by the server computer, a confirmation response message from the first user device; and
   transmitting, by the server computer, a transaction message comprising the account identifier of the receiver that was received in the verification response message, wherein sending the transaction message causes an alert to be provided to the second user device, and wherein transmitting the transaction message causes a transfer to be made in the second country to credit an account corresponding to the account identifier of the receiver.

2. The method of claim 1, further comprising:
   receiving, by the server computer from the first user device, account data regarding a sender operating the first user device, the account data comprising a corresponding account identifier of the sender;
   transmitting, by the server computer to an authorizing entity computer associated with the sender, an automatic funds transfer (AFT) message; and
   receiving, by the server computer from the authorizing entity computer, a response indicating funds have been transferred from a first account associated with the sender to a second account associated with a service provider related to the server computer.

3. The method of claim 2, wherein transmitting the transaction message occurs in response to receiving the response indicating the funds have been transferred.

4. The method of claim 1, further comprising:
   receiving, by the server computer, a registration message from one or more wallet aggregator computers, the one or more wallet aggregator computers comprising the wallet aggregator computer; and
   in response to receiving the registration message, storing registration information associated with the one or more wallet aggregator computers at a data store accessible to the server computer.

5. The method of claim 4, further comprising:
   identifying, by the server computer, the wallet aggregator computer to which to transmit the verification request message, the wallet aggregator computer being identified from the one or more wallet aggregator computers based at least in part on the mobile number received in the verification request message and the registration information associated with the one or more wallet aggregator computers.

6. The method of claim 1, wherein the server computer is operated on behalf of a financial transfer service provider.

7. The method of claim 1, wherein the transaction message is an original credit transaction (OCT) message.

8. The method of claim 1, wherein the wallet aggregator computer is selected from a plurality of wallet aggregator computers located in the second country based at least in part on at least a portion of the mobile number, and wherein the wallet aggregator computer is associated with a geographical area of the second country.

9. The method of claim 1, wherein the account identifier of the verification response message is identified based at least in part on the mobile number and the name.

10. A server computer comprising:
  a processor; and
  a computer readable medium coupled to the processor, the computer readable medium comprising code, executable by the processor, to cause the server computer to:
    receive, from a first user device located in a first country, transfer data regarding a receiver operating a second user device corresponding to a second country, the transfer data comprising a mobile number and a name;
    transmit, to a processing network computer, a verification request message, wherein transmitting the verification request message to the processing network computer causes the processing network computer to transmit the verification request message to a wallet aggregator computer located in the second country, wherein the verification request message comprises the mobile number and the name, and wherein the wallet aggregator computer maintains a plurality of account identifiers aggregated from a plurality of digital wallet providers of the second country;
    receive, from the wallet aggregator computer via the processing network computer, a verification response message initiated by the wallet aggregator computer, the verification response message comprising an account identifier of the receiver;
    transmit a confirmation request message to the first user device;
    receive a confirmation response message from the first user device; and
    transmit a transaction message comprising the account identifier of the receiver that was received in the verification response message, wherein sending the transaction message causes an alert to be provided to the second user device, and wherein transmitting the transaction message causes a transfer to be made in the second country to credit an account corresponding to the account identifier of the receiver.

11. The server computer of claim 10, wherein executing the code further causes the server computer to:
  receive, from the first user device, account data regarding a sender operating the first user device, the account data comprising a corresponding account identifier of the sender;
  transmit, to an authorizing entity computer associated with the sender, an automatic funds transfer (AFT) message; and
  receive, from the authorizing entity computer, a response indicating funds have been transferred from a first account associated with the sender to a second account associated with a service provider related to the server computer.

12. The server computer of claim 11, wherein transmitting the transaction message occurs in response to receiving the response indicating the funds have been transferred.

13. The server computer of claim 10, wherein executing the code further causes the server computer to:
  receive a registration message from one or more wallet aggregator computers, the one or more wallet aggregator computers comprising the wallet aggregator computer; and
  in response to receiving the registration message, store registration information associated with the one or more wallet aggregator computers at a data store accessible to the server computer.

14. The server computer of claim 13, wherein executing the code further causes the server computer to:
  identify the wallet aggregator computer to which to transmit the verification request message, the wallet aggregator computer being identified from the one or more wallet aggregator computers based at least in part on the mobile number received in the verification request message and the registration information associated with the one or more wallet aggregator computers.

15. The server computer of claim 10, wherein the server computer is operated on behalf of a financial transfer service provider.

16. The server computer of claim 10, wherein the transaction message is an original credit transaction (OCT) message.

* * * * *